C. A. WHITEHORN.
ANIMAL POKE.
APPLICATION FILED AUG. 9, 1920.
1,404,415.
Patented Jan. 24, 1922.
3 SHEETS—SHEET 3.
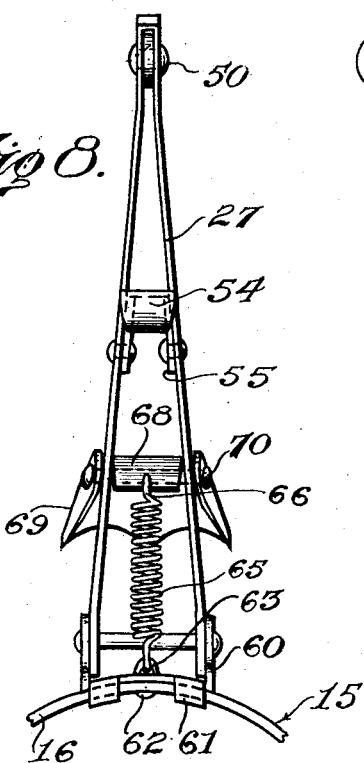
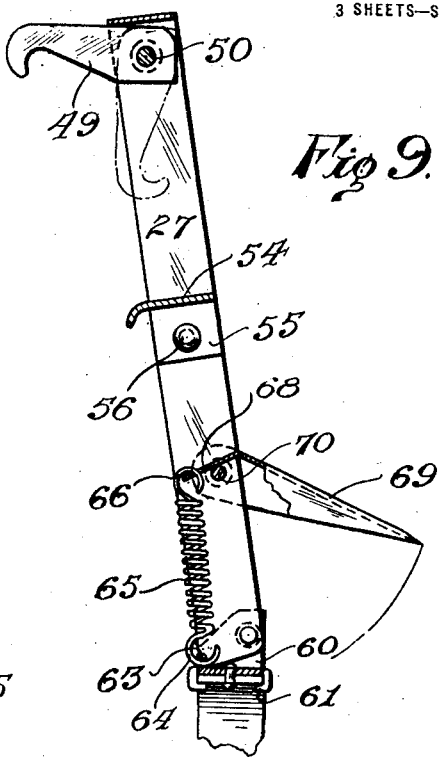
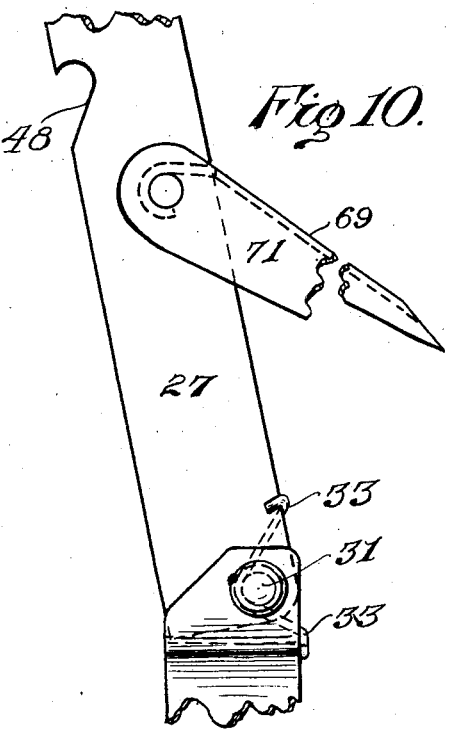
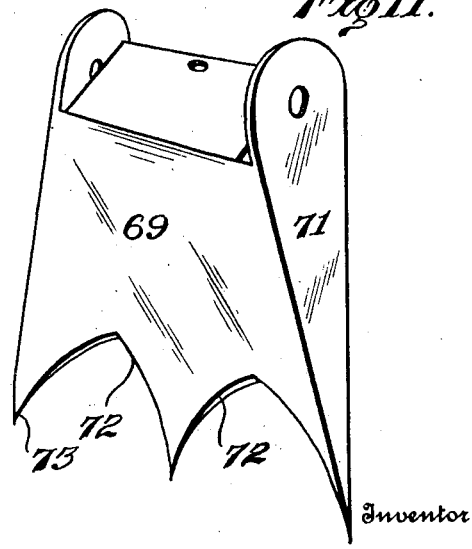
Inventor
C. A. Whitehorn
By Lacy & Lacy, Attorneys

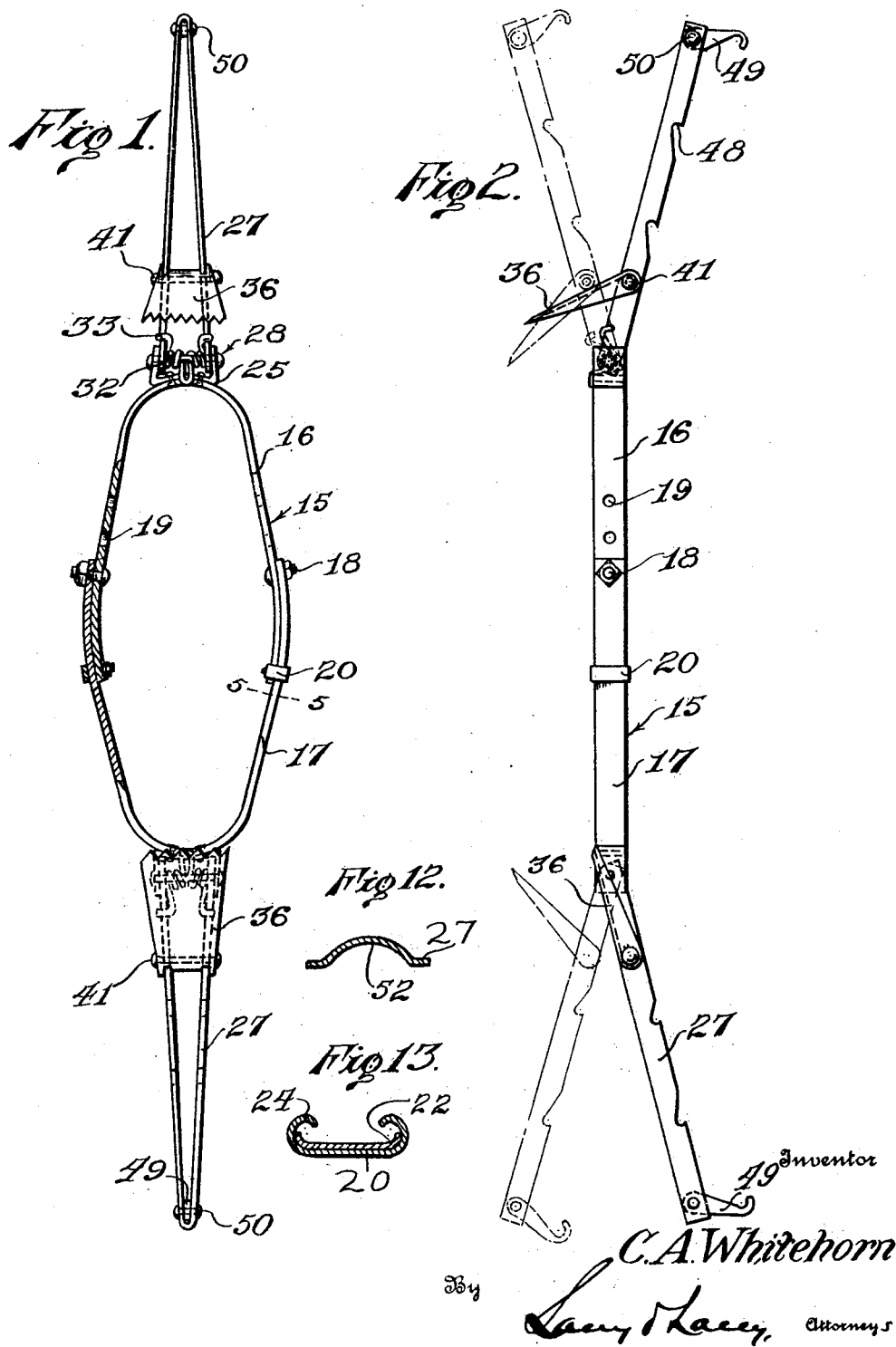

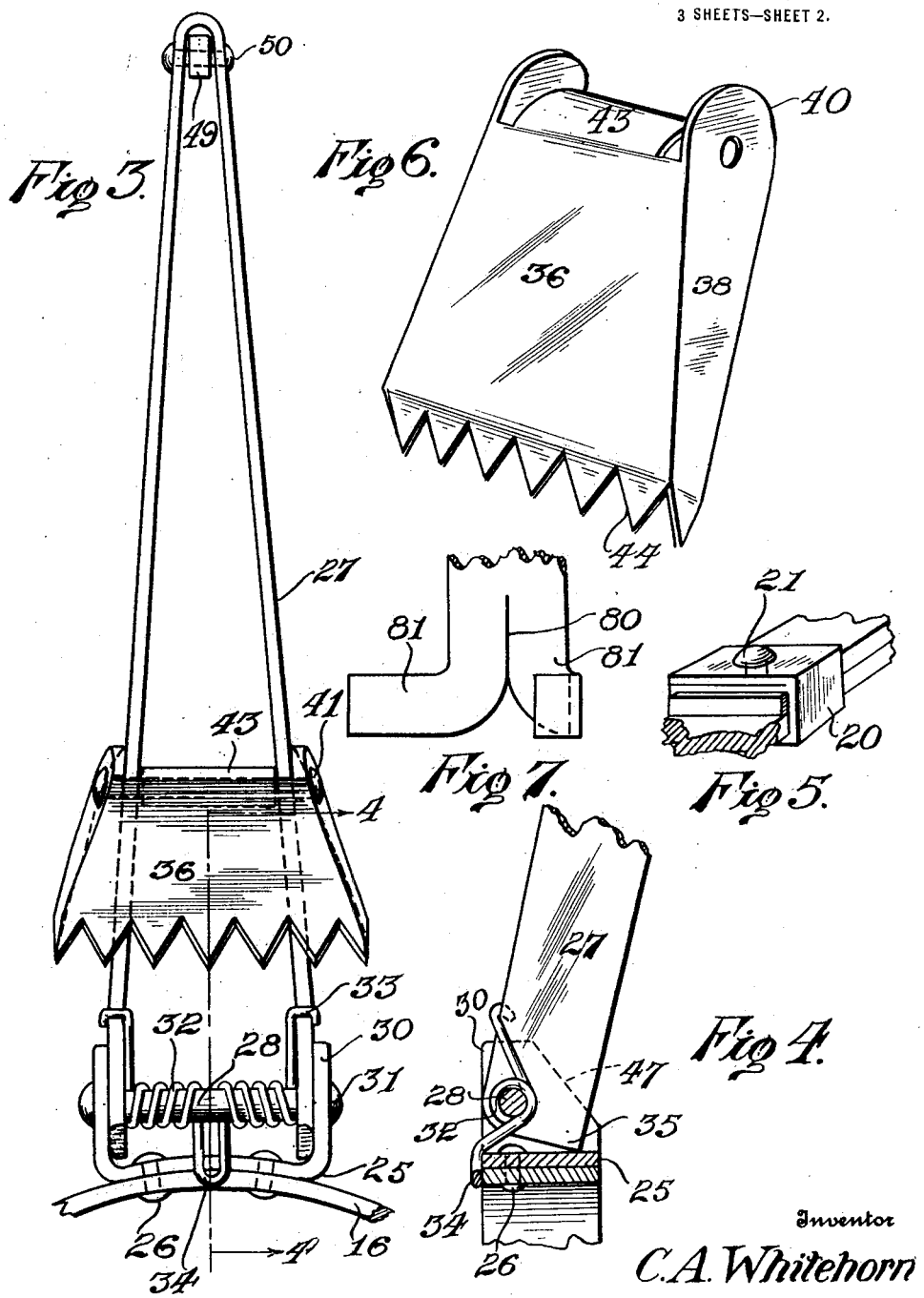

UNITED STATES PATENT OFFICE.

CHESTER A. WHITEHORN, OF PORTAGE, MONTANA.

ANIMAL POKE.

1,404,415.      Specification of Letters Patent.      Patented Jan. 24, 1922.

Application filed August 9, 1920. Serial No. 402,136.

*To all whom it may concern:*

Be it known that I, CHESTER A. WHITEHORN, citizen of the United States, residing at Portage, in the county of Cascade and State of Montana, have invented certain new and useful Improvements in Animal Pokes, of which the following is a specification.

This invention relates to improvements in pokes especially adapted for use in preventing animals from working their way through or over enclosures.

An important object of this invention is to provide an animal poke which when applied will inflict severe pain upon the animal should it try to break through a fence or other enclosure.

A further object of the invention is to provide an animal poke having novel means whereby the spurs or pain inflicting means are automatically disengaged from the animal's neck as the animal withdraws from the fence or other enclosure.

A further object of the invention is to provide an animal poke having a plurality of projecting arms provided with simple means for engaging the wire of a fence as the animal attempts to pass therethrough.

The invention forming the subject matter of this application aims also to provide an animal poke which is capable of being compactly folded so as to occupy a minimum of space during shipment.

A further object of this invention is to provide an animal poke which is harmless, durable in use, and cheap to manufacture.

Other objects and advantages of the invention will be apparent during the course of the following description.

In the accompanying drawings, forming a part of this application and in which like numerals are employed to designate like parts throughout the same:

Figure 1 is a rear elevation of the improved poke, parts thereof being shown in section, Figure 2 is a side elevation of the improved poke, Figure 3 is a fragmentary rear elevation of the poke, the view illustrating the means for swingingly supporting one of the fence engaging arms, Figure 4 is a detail section taken on the line 4—4 of Figure 3, Figure 5 is a detail perspective view of the collar, the view illustrating the means for adjustably connecting the sections of the collar, Figure 6 is a perspective view of a spur embodied in the invention, Figure 7 is a detail elevation of the collar embodying a slightly modified form of keeper, Figure 8 is a front elevation of a slightly modified form of arm, Figure 9 is a central vertical sectional view through the arm illustrated in Figure 8, Figure 10 is a detail side elevation of the poke illustrated in Figures 1 and 2, Figure 11 is a perspective view of a slightly modified form of spur, Figure 12 is a sectional view through one of the arms, the view illustrating a possible formation of the material of the arms, Figure 13 is a detail sectional view through the collar, the view illustrating a possible formation of the material from which the collar is formed.

In the drawings, wherein for the purpose of illustration are shown several preferred embodiments of the invention, the numeral 15 generally designates the collar of the improved poke, which collar is, of course, adapted to be arranged about the neck of an animal. The collar 15 comprises an upper section 16 and a lower section 17 adjustably connected to the upper section by means of bolts 18 passed through spaced apertures 19 in the upper section. The lower portion of the upper section is provided with a pair of rectangular loops or keepers 20 which slidably receive the arms of the lower section and permit of the lengthening or shortening of the collar when adjusting the same to the neck of an animal. As illustrated in Figure 5, the rectangular loops or keepers 20 may be secured to the lower portions of the arms of the lower section 16 by means of rivets 21.

As illustrated in Figure 13, the material from which the collar is formed may have its edge portions curved outwardly as indicated at 22 so as to provide a smooth and rounded surface to bear against the neck of the animal and thereby prevent the neck of the animal from becoming scratched or lacerated. In this case, the keepers 20 also have their edge portions curved inwardly as indicated at 24 so as to provide rounded bearing surfaces and so as to overhang the curved edge portions of the collar. In addition to providing a smooth bearing surface, the material illustrated in Figure 13 is possessed of an increased degree of strength so that the device will not be likely to lose its shape as the result of strain or abuse. Moreover, various other forms of material may be used in forming the collar without departing from the spirit of the invention, this feature being merely one of choice.

Each section of the collar 15 has its intermediate portion provided with a U-shaped bracket 25 anchored to the said section by means of a plurality of rivets 26 having rounded heads which when engaged with the skin of the animal will not cut or bruise. With particular reference to Figure 3, it will be observed that the bracket 25 pivotally supports a fence engaging arm 27 which is formed from a length of metal bent intermediate its ends to form diverging sides. The end portions of the diverging sides of the arm 27 are formed with apertures which rotatably receive a pivot pin 28 having its end portions extending through the apertured ears 30 of the brackets 25. The end portions of the pivot element may, if desired, be formed with rounded heads 31 which serve to secure the pivot element in position. A coil spring 32 is mounted upon the pivot element 28 between the diverging sides of the arm 27 and has its end portions or terminals 33 engaged with the sides of the arm so as to urge the same forwardly to its normal position. The intermediate portion of the spring 32 is extended downwardly and is engaged with the adjacent portion of the bracket and collar as indicated at 34. One end portion of each side of the arm 27 has one corner 35 adapted for engagement with the bottom wall of the bracket so as to limit the forward pivotal movement of the arm. The forward sides of the arms are, of course, adapted for engaging the wire of a fence so as to prevent the animal from passing through the fence and thereby escaping. Upon the engagement of either arm 27 with the fence, the arm, of course, moves rearwardly so as to engage prongs or spurs 36 with the neck of the animal.

As illustrated in Figure 6, the spur 36 is formed from a single blank of flat metal having its edge portions extended inwardly to form sides 38 which, in turn, have their rear end portions formed with apertured ears 40 which rotatably receive a pivot element 41. The pivot element 41 is also extended through the sides of the arm 27 and is embraced by a transversely curved extension 43 at the rear end of the spur 36. It will be observed that the rearwardly extending portion 43 of the spur 36 is spaced from the apertured ears 40 so as to accommodate the sides of the arms 27. The free end portion of the spur 36 is flared and is formed with a plurality of short teeth 44 which engage the skin of the animal whereby the pain caused by such engagement will cause the animal to immediately withdraw from the fence. Since the free end portion of the spur 36 is enlarged and since the teeth are relatively short, the same will not seriously injure the animal. That is to say, the spurs will not be allowed to enter the flesh of the animal to any great extent. Therefore, should the animal become excited as a result of the pain incurred, continued effort to pass through the fence will not unduly cut or lacerate the flesh of the animal.

Should the wire of the fence engage one of the arms adjacent the inner portion of the same, the upstanding ears 30 of the brackets 25 will not interfere with the rearward movement of the arms since the forward edge portions of the same are beveled as indicated at 47. In other words, the wire will not under any circumstances be engaged with the forward edges of the ears 30 and thereby prevented from moving the arms 27 rearwardly.

The arms 27 may be provided with a plurality of spaced inclined notches 48 adapted to receive the wire of the fence so that the wire will be prevented from slipping off the ends of the arms. The end portions of the arms 27 are further provided with hooks 49 supported between its sides by pivot elements 50. The hooks are held in adjusted position by frictional contact with the sides of the arms and during shipment of the device, the hooks 49 may, as illustrated in dotted lines in Figure 9, be positioned between the sides of the arms to occupy but a small amount of space. As illustrated in Figure 2, the hooks 49 project forwardly from the arms and absolutely prevent the wire of the fence from passing over the ends of the arms. The material of the arms 27 may, if desired, be formed between its edges with a reinforcing channel or corrugation 52 which increases the strength of the arms and enables the same to withstand strain incident to use.

In lieu of the notches 48, the arms may be each provided with a forwardly projecting rigid hook 54 having downwardly extending attaching ears 55 secured to the inner sides of the arm by means of rivets 56. The hooks 54 project forwardly from the arms and effectively engage the wire so as to prevent the same from slipping off the ends of the arms. Further, the hooks 54 serve to strengthen the arms since the sides of each arm are rigidly connected by a hook and the ears 55 of the same.

With reference to Figures 8 and 9, it will be observed that a bracket 60 may be employed for supporting each of the arms of the poke and the base of the bracket may be formed with pairs of downwardly and inwardly extending lugs 61 which grip the collar and, cooperating with a rivet 62, serve to securely hold the bracket in position. When the lugs 61 are employed only one rivet 62 need be employed. As further illustrated in these views, the bracket 60 is formed with an upstanding apertured ear 63 having connection with the eye 64 of a coil spring 65 which in turn has its upper end formed with an eye 66 which is connected to the rearwardly extending portion 68 of a spur 69. The coil spring 65 serves to normally hold the spur 69 in extended position and also serves to hold the arm in a forwardly extending horizontal position. It is, therefore, apparent that the spring 65 serves a dual function. The spur 69 is, of course, supported by a pivot element 70 extending through the sides of the arm and when it is desired to fold or collapse the poke for shipment, it is merely necessary to disconnect the spring 65 and swing the sides 71 of the spur 69 about the sides of the arm. With the spur thus folded flatly into contact with the arm, the poke occupies a minimum amount of space and is not possessed of any objectionable projections.

As illustrated in Figure 11, the spur 69 may be provided with a pair of approximately V-shaped notches 72 which form pointed teeth 73 adapted for biting into the flesh of the animal as the arms move rearwardly.

In the modified form of the invention shown in Figure 7, the rectangular keepers 20 may be dispensed with and the lower portions of the sides of the section 16 may be formed with longitudinal incisions 80 which form arms 81 adapted to be bent into rectangular formation to form keepers or loops which slidably receive the upper portions of the lower sections 17.

In the use of the improved poke, the same is applied to the neck of an animal with the spurs 36 or 69 facing rearwardly. When the animal attempts to pass through or over a fence, the arms 27 are moved rearwardly so that the spurs will be caused to enter the flesh of the animal and inflict pain which will immediately cause the animal to withdraw. However, the spurs will not unduly cut or lacerate the flesh of the animal. The device may be readily and conveniently adjusted to animals of various sizes by inserting the bolts 18 through the proper openings 19.

The foregoing illustrates that the inventive idea forming the subject matter of this application is capable of a variety of mechanical expressions and, therefore, it is to be understood that the forms of the invention herewith shown and described are to be taken merely as preferred examples of the same and that such minor changes in arrangement and construction of parts may be made as will remain within the spirit of the invention and the scope of what is claimed.

Having thus described the invention, what is claimed as new is:

1. A device of the class described comprising a collar, brackets carried by the collar, arms carried by the brackets and having spaced converging sides, and hooks pivotally carried by said arms between the sides of the same.

2. A device of the class described comprising a collar, brackets carried by the collar, arms carried by the brackets and having spaced converging sides, hooks pivotally carried by said arms between the sides of the same, and spurs carried by said arms and foldable upon the same.

3. A yoke comprising a collar, U-shaped brackets carried by the collar, pivot elements carried by said brackets, arms having sides connected to said pivot elements, coil springs mounted on said pivot elements and having terminals engaged with the sides of said arms and intermediate lateral portions engaging the brackets for urging the arms forwardly, and spurs carried by said arms intermediate the ends of the same.

4. A yoke comprising a collar, U-shaped brackets carried by the collar, pivot elements carried by said brackets, arms having sides connected to said pivot elements, coil springs mounted on said pivot elements and having terminals engaged with the sides of said arms and adapted for urging the first named arms forwardly, spurs carried by said first named arms intermediate the ends of the same, and hooks carried by said arms between the sides of the same.

5. A yoke comprising a collar, a bracket carried by the collar, a pivot element connected to the bracket, an arm having sides connected to said pivot element inwardly of the sides of said bracket, and a spur having its edge portions extended inwardly to form sides, said sides being arranged exteriorly of the sides of said arm and pivotally connected to the same.

In testimony whereof I affix my signature.

CHESTER A. WHITEHORN. [L. S.]